United States Patent Office 2,748,052
Patented May 29, 1956

2,748,052

THERAPEUTICALLY ACTIVE COMPOSITIONS CONTAINING AMPHETAMINE

Armin Rosner, Brooklyn, N. Y.

No Drawing. Application December 17, 1952, Serial No. 326,585

2 Claims. (Cl. 167—55)

This invention relates to a new and improved composition consisting of amphetamine compounds and has particular relation to a new and useful therapeutic agent for the treatment of obesity, containing the beforementioned compounds. The compositions of the invention are also effective for the treatment of hypertension by virtue of their property of effecting weight loss.

It has been known that amphetamine, i. e., 1-phenyl-2-aminopropane, as well as certain derivatives, particularly certain salts, of the same, act as stimulants for the central nervous system and are capable of exerting valuable effects in the treatment of obesity. However, said compounds have also certain undesirable effects, e. g. an undesirable stimulation of the sympathetic nervous system and a relatively high toxicity.

It is the main object of the present invention to provide a therapeutic agent, the beneficial effects of which are higher and the undesirable side-effects of which are lower in comparison with known amphetamine compounds or compositions.

Other objects and the advantages of the invention will be apparent from the appended claims and the following specification which describes by way of example, and without limitation, some embodiments of the invention.

It has been found that a product which contains 10 to 90% of amphetamine saccharate or amphetamine mucate, or of a mixture of these amphetamine compounds, in mixture with other amphetamines, possesses the beneficial effects of amphetamine compounds to an increased extent and the harmful or undesired effects to a reduced extent, in comparison with products of this type, now in use. In addition to amphetamine saccharate and/or amphetamine mucate, the compositions of the invention contain other amphetamine salts, such as dextro amphetamine sulfate, methamphetamine hydrochloride, and dl amphetamine sulfate.

*Example 1*

The following ingredients are first mixed, and then granulated and reground to assure a completely uniform and intimate combination:

| | Part by weight |
|---|---|
| Dextro amphetamine sulfate | 1 |
| Methamphetamine saccharate | 1 |
| Methamphetamine hydrochloride | 1 |
| dl Amphetamine sulfate | 1 |

The uniform mixture thus formed is converted into tablets containing the desired amount of the above composition, with the addition of conventional tableting ingredients, such as binding, sweetening and coloring agents.

*Example 2*

| | Part by weight |
|---|---|
| Dextro amphetamine sulfate | 1 |
| Methamphetamine saccharate | 1 |
| Methamphetamine hydrochloride | 1 |
| Methamphetamine mucate | 1 |

*Example 3*

| | Percent by weight |
|---|---|
| Methamphetamine saccharate | 90 |
| Dextro amphetamine sulfate | 10 |

*Example 4*

| | Percent by weight |
|---|---|
| Methamphetamine saccharate | 80 |
| Dextro amphetamine sulfate | 8 |
| Methamphetamine hydrochloride | 12.0 |

*Example 5*

| | Percent by weight |
|---|---|
| Methamphetamine saccharate | 70 |
| Dextro amphetamine sulfate | 15 |
| Methamphetamine hydrochloride | 5 |
| dl Amphetamine sulfate | 10 |

*Example 6*

| | Percent by weight |
|---|---|
| Methamphetamine saccharate | 85 |
| Dextro amphetamine sulfate | 5 |
| Methamphetamine hydrochloride | 5 |
| dl Amphetamine sulfate | 5 |

*Example 7*

| | Percent by weight |
|---|---|
| Dextro amphetamine sulfate | 5 |
| Methamphetamine saccharate | 30 |
| Methamphetamine hydrochloride | 5 |
| Methamphetamine mucate | 60 |

*Example 8*

| | Percent by weight |
|---|---|
| Methamphetamine saccharate | 7.5 |
| Methamphetamine mucate | 10.0 |
| Methamphetamine hydrochloride | 82.5 |

*Example 9*

| | Percent by weight |
|---|---|
| Methamphetamine saccharate | 30 |
| dl Amphetamine sulfate | 50 |
| Methamphetamine mucate | 20 |

*Example 10*

| | Percent by weight |
|---|---|
| Methamphetamine mucate | 65 |
| Dextro amphetamine sulfate | 10 |
| Methamphetamine hydrochloride | 25 |

*Example 11*

| | Percent by weight |
|---|---|
| Dextro amphetamine mucate | 55 |
| Methamphetamine hydrochloride | 45 |

*Example 12*

| | Percent by weight |
|---|---|
| Methamphetamine saccharate | 88 |
| Methamphetamine hydrochloride | 12 |

*Example 13*

| | Percent by weight |
|---|---|
| Methamphetamine saccharate | 60 |
| Dextro amphetamine sulfate | 5 |
| Methamphetamine hydrochloride | 5 |
| dl Amphetamine sulfate | 5 |
| Methamphetamine mucate | 25 |

*Example 14*

| | Percent by weight |
|---|---|
| Methamphetamine mucate | 55 |
| Dextro amphetamine sulfate | 5 |
| Methamphetamine hydrochloride | 5 |
| dl Amphetamine sulfate | 5 |
| Methamphetamine saccharate | 30 |

It has been found that compositions embodying the present invention, have the following advantages in comparison with known amphetamine products. They have greater power of appetite curbing and a more prolonged action. These properties indicate a synergistic effect of the individual ingredients present in the compositions of the invention.

It will be understood that the invention is not limited to the specific details described above and can be carried out with various modifications. For example, instead of using tablets, the compositions can be incorporated in liquid or semi-liquid media, e. g. syrups. Furthermore, the compositions can be used in mixture with compatible ingredients, e. g. aspirin, phenacetin or others, which do not affect the therapeutic effect of the amphetamine combination. These and other modifications can be made without departing from the scope of the invention as defined in the appended claims.

What is claimed is:

1. A therapeutically active composition of amphetamine salts, containing at least one salt of the group consisting of methamphetamine saccharate and methamphetamine mucate in an amount of about 10 to 90% by weight, based on the total weight of the amphetamine salts, the balance consisting of amphetamine salts, other than the saccharate and mucate, and a pharmaceutical carrier.

2. A therapeutically active composition as claimed in claim 1, also containing at least one compound of the group consisting of dextro amphetamine sulfate, methamphetamine hydrochloride and dl amphetamine sulfate, in an amount of about 90 to 10% by weight of the total weight of amphetamine compounds and a pharmaceutical carrier.

References Cited in the file of this patent

UNITED STATES PATENTS 2,369,711     Blythe _____ Feb. 20, 1945

FOREIGN PATENTS 576,312     Great Britain _____ Mar. 28, 1946

OTHER REFERENCES

United States Dispensatory, 24th edition, 1947, Lippincott Company, Philadelphia, Pennsylvania, pages 76 to 78, 1617.